United States Patent [19]

Comroe et al.

[11] Patent Number: 5,425,030
[45] Date of Patent: * Jun. 13, 1995

[54] ON-SITE SYSTEM FREQUENCY SHARING WITH TRUNKING SYSTEM

[75] Inventors: Richard A. Comroe, Dundee; Arun Sobti, Wheaton; Paul M. Bocci, Roselle; Robert W. Furtaw, Arlington Heights; Bradley M. Hiben, Glen Ellyn; James A. McDonald, Buffalo Grove; Robert W. Furtaw, Lake Zurich, all of Ill.

[73] Assignee: Motorola Inc., Schaumburg, Ill.

[*] Notice: The portion of the term of this patent subsequent to Aug. 13, 2008 has been disclaimed.

[21] Appl. No.: 790,846

[22] Filed: Nov. 12, 1991

Related U.S. Application Data

[63] Continuation-in-part of Ser. No. 546,474, Jun. 29, 1990, abandoned.

[51] Int. Cl.$^6$ .............................................. H04J 3/16
[52] U.S. Cl. ................................... 370/95.1; 455/32.1
[58] Field of Search ................. 370/95.1, 95.3; 379/59, 379/60, 61; 455/33.1-33.4, 34.1, 34.2, 32.1, 56.1, 67.1, 67.4

[56] References Cited

U.S. PATENT DOCUMENTS

| 5,034,993 | 7/1991 | Sasuta et al. | 455/56.1 |
| 5,040,238 | 8/1991 | Comroe et al. | 455/56.1 |

*Primary Examiner*—Douglas W. Olms
*Assistant Examiner*—Dang Ton
*Attorney, Agent, or Firm*—Jon P. Christensen; Daniel C. Crilly

[57] ABSTRACT

A method of allowing use of small, low-power communication systems (20) within the coverage area (11) of larger trunked communication systems. A low-power communication system re-uses the same communication resources used by the larger trunked system whenever sufficient distance exists between large system communication units and the low power system so as to avoid interference. Large system communication units may also be constructed to operate in a dual mode format so as to transmit and receive in a low power mode and on re-used resources, whenever near a low power system or to transmit and receive in a high power mode whenever else necessary.

26 Claims, 3 Drawing Sheets

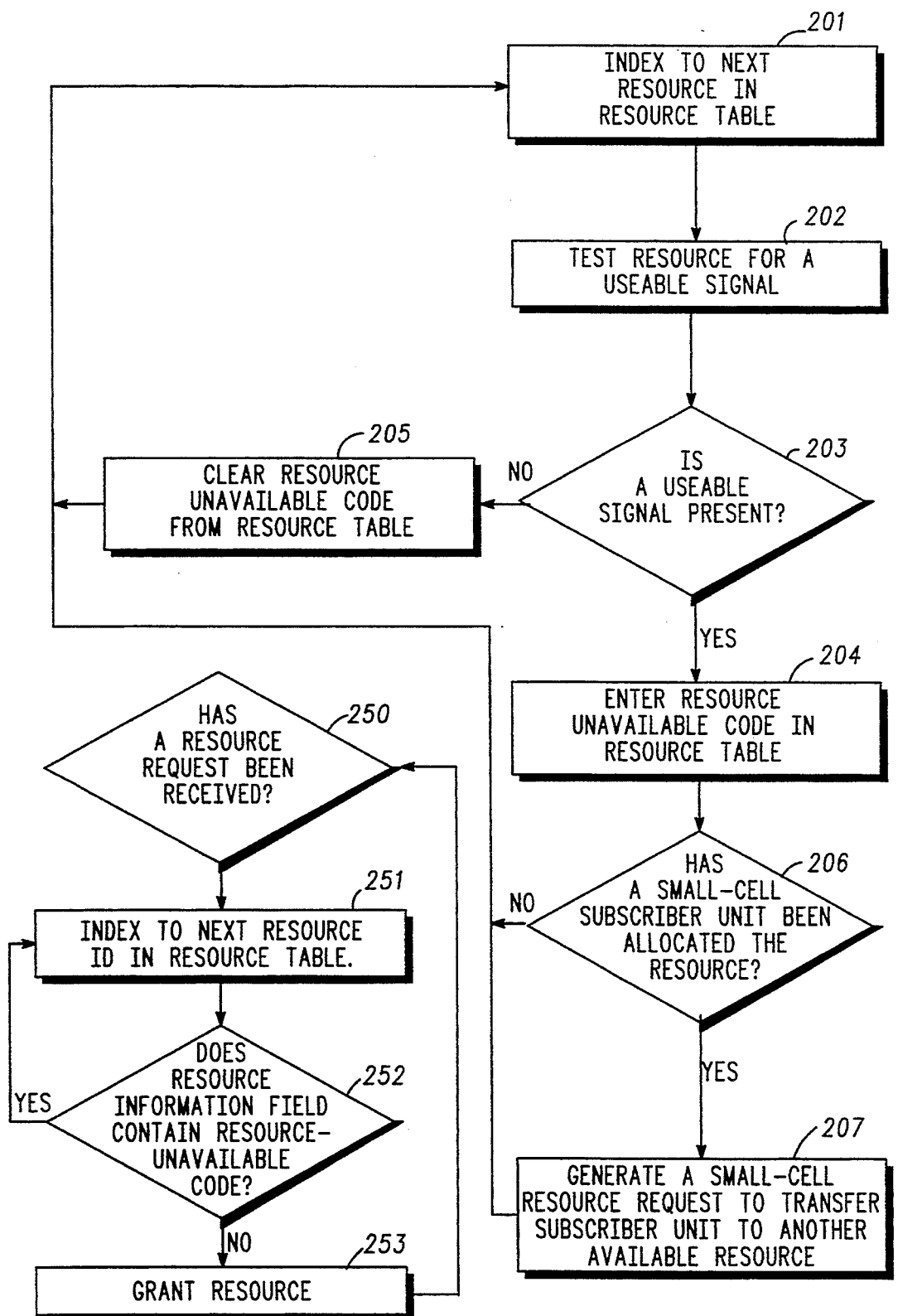

ON-SITE SYSTEM FREQUENCY SHARING WITH TRUNKING SYSTEM

This is a continuation-in-part of application Ser. No. 07/546,474 filed Jun. 29, 1990 now abandoned.

FIELD OF THE INVENTION

This invention relates generally to the field of communication systems and more specifically to trunked communication systems.

BACKGROUND OF THE INVENTION

Trunked communication systems are known. Such systems typically use a base site including a resource controller and a number of transceivers. The base site then services communication units located within a relatively large geographic area (service coverage area). A number of transceivers are required for the base site to service multiple simultaneous conversations. The number of simultaneous conversations within a particular service coverage area is mainly limited by the size of the spectrum available. On the other hand, the size of a service coverage area is typically chosen to be as large as possible (to minimize infrastructure complexity and cost).

Communication units desiring service submit (transmit) a request for service over a control resource (such as a dedicated control channel comprised of a particular frequency or time division multiplex (TDM) time slot) reserved for that purpose. The communication unit upon requesting service is granted a communication resource (such as a frequency pair or TDM time slot) for transmitting and receiving communications. The base site then supports the communication transaction through local transceivers.

As the number of communication units has increased, trunked systems have become congested. A smaller coverage area provides for reduced numbers of mobile units within a given area and, therefore, less competition for available spectrum. A smaller coverage area also allows transmitting units to reduce transmitted power levels. Reducing the power levels of base sites and communication units allows for the same frequencies to be used by other communication units located in surrounding service coverage areas (geographic reuse) without interference.

While geographic re-use can result in significant increases in efficiency the need for dispatch communications between widely dispersed groups still exists. A need therefore exists for other means/methodologies for increasing the efficiency of the use of communication resources, while retaining large coverage area trunking system dispatch services.

SUMMARY OF THE INVENTION

Pursuant to one embodiment of the invention in a geographic re-use context, trunked communication systems operate with smaller, low-power (small-cell) communication systems within the service coverage area of the larger trunked system. Use of the small-cell communication systems are limited to areas within the larger trunked system where use of the small-cell systems does not interfere with trunked system operation. Interference within the larger trunked system is controlled by a means for limiting the coverage area of the small-cell system through reduced power output of the small-cell system.

Areas within the large-cell trunked system where small-cell operation does not create interference in most cases is a function of distance from a large-cell broadcasting site. In most cases a predetermined distance can be identified within which small-cell operation is not permitted. Outside of the predetermined distance small-cell systems may be located at predetermined locations without concern of interference.

In one embodiment, trunked communication units are normally constructed to operate with transmitted power levels of several watts. Base sites operate using antenna extending to high elevations and at power levels several times higher than the communication units. The small-cell units, on the other hand, will operate with a means for limiting the power and signal level of the output signal to significantly lower levels. Small-cell communications units (and base site) will typically operate at power levels of approximately ten milliwatts. As such, a communication unit can be said to be operating at a power level several orders of magnitude above the power level of a small-cell unit, but still below the power level of the base site of the larger system.

A base site transmission may potentially interfere with mall-cell transmissions anywhere within the coverage area of the base site. Communication units, on the other hand, operate it a lower power level than the base sites with antenna that ire relatively close to the ground. Because of the lower power transmitters and antenna orientation, transmissions from communication units seldom reach receivers outside the immediate area of the communication unit. If not for the elevated antenna, it would be difficult for the base sites to receive signals from the communication units.

Because of the relatively short range of a communication unit, a small-cell system can operate on the same transmission frequency as a communication unit, both within the large-cell trunked system, without interference whenever sufficient geographic separation exists.

In one embodiment, small-cell communication units and small-cell base sites transmit and receive on a single frequency which is shared with the larger system. Time division multiplexing can be used to support duplex operation on the small-cell system as well understood in the art.

The limited range of the small-cell system may extend from a few feet to a few hundred feet. Such a small-cell system may be operated far away (far-field) from a larger system base site without significant interference.

BRIEF DESCRIPTION OF THE DRAWINGS

FIG. 4 comprises a flow chart for communication resource availability within the small-cell system.

FIG. 5 comprises a flow chart for the allocation of communication resources within the small-cell system.

DESCRIPTION OF A PREFERRED EMBODIMENT

Figure 1:
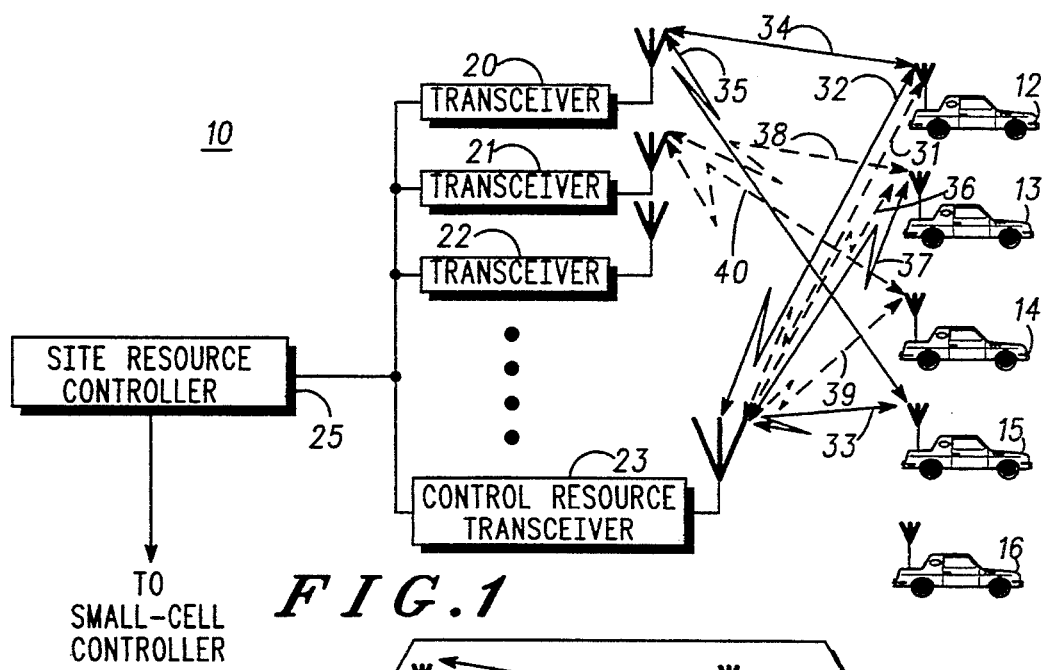
FIG. 1 comprises a block diagram of communication equipment within a single cell of a trunked communication system with two requesting communication unit communicating with two target communication units.

Referring now to FIG. 1, a single, large system cell of a trunked communication system is depicted generally by the number 10. The cell (10) generally includes a plurality of communication units (12 through 16) (as used herein "communication units" refers to mobile units, or portable units), repeaters (20 through 22), and a site resource controller (25). The system also includes a control resource transceiver (23) to allow two-way transmission of system control information.

In general, to establish a call between two communication units operating in such a cell (10) a requesting unit (12) sends a data packet called an inbound signalling word (ISW) (31) on the inbound frequency allocated to the control resource transceiver (23). The ISW (31) typically contains the requesting communication unit's unique ID code plus the ID number of the target party (or parties) or group. The site resource controller (25) decodes the request, and transmits on the control resource transceiver (23) an appropriate resource grant outbound signalling word (OSW) (32) to the requesting communication unit (12). The requesting communication unit's (12) frequency grant OSW (32) causes it to move to the designated transmit frequency (or to the designated time slot in a TDM system). If the target party is another mobile communication unit (15) located within the same cell the resource controller at the same time also transmits an OSW (33) to the target unit identifying the receive frequency. When the requesting unit (12) initiates a voice transmission (34) the base site repeater (20) receives the transmission (34) and retransmits the voice signal on the receive frequency (35) to the target party (15).

If, after initiation of the conversation between the two mobile communication units (12 and 15), another communication unit (13) were to request service then the situation further shown in dotted lines in FIG. 1 would exist. FIG. 1 shows a requesting communication unit (13) transmitting an ISW (36) to the site resource controller and receiving an OSW (37) defining a frequency grant through another repeater (21). The target party (14) for the requesting communication unit (13) receives an OSW (39) defining a frequency grant. The requesting communication unit (13) and target (14) move to the designated frequency and begin transmitting and receiving on the assigned frequency (38) and (40).

Figure 2:
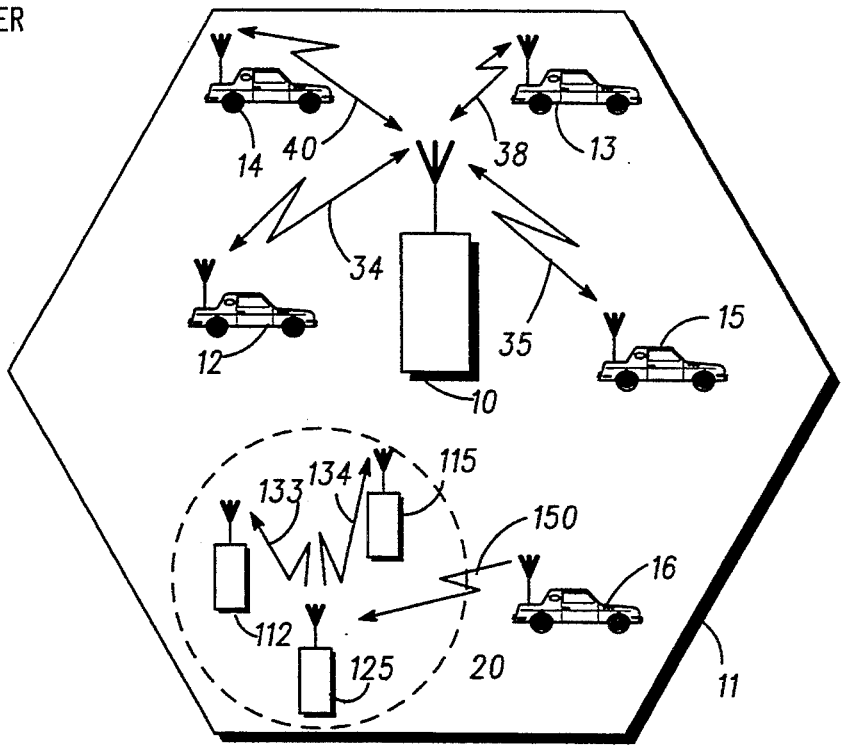
FIG. 2 depicts, in a geographical context, a single cell of a trunked communication system showing two requesting communication units communicating with two target communication units.

Shown in FIG. 2 is the situation substantially described in the previous example. The requesting communication unit (12) is shown to be in close proximity to the base site (10). As shown, an ongoing conversation exists between the original two communication units (12 and 15). Also shown is the ongoing conversation between the second set of communication unit (13 and 14). The second requesting communication unit (13) is shown to be at the edges of the service coverage area (11) of the cell (10).

A small-cell communication system (FIG. 3) has a similar functionality to the larger trunked system (10) but operates at a substantially reduced power level. Small-cell communication units (112 through 115), small-cell repeaters (120 through 122), and the small-cell control resource transceiver (123) operate in the area of typically ten milliwatts.

Figure 7:
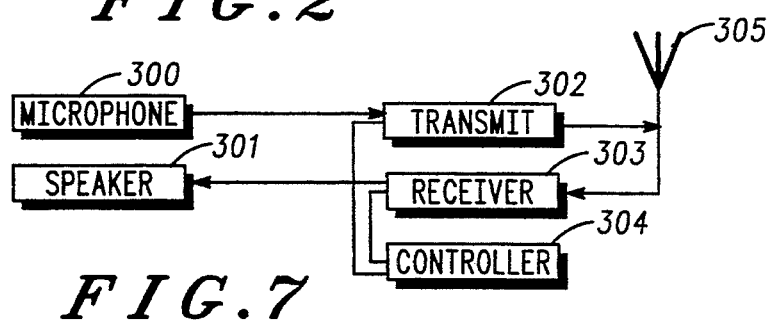
FIG. 7 comprises a block diagram of a small-cell communication unit.

Small-cell communication units (112 through 115) are each constructed (FIG. 7) with a means (e.g. communication unit receiver (303) and communication unit controller (304)) for monitoring a small-cell resource controller for small-cell trunking commands. Small-cell communication units (112 through 115) also contain means (e.g. a transmitter (302) and controller (304)) for submitting small-cell system resource requests to the small cell resource controller.

Small-cell repeaters, as in the large-cell trunked system, provide for the reception and distribution of signals throughout the coverage area of the small-cell system. Repeaters operatively coupled to the controller of the small-cell system (120 through 122) are also equipped for the detection of control bits from authorized small-cell communication units.

A requesting small-cell communication unit (112) transmits an ISW (131) to and receives a frequency grant OSW (132) from a small-cell resource controller (125), on a small-cell control resource substantially as described above. Two-way transmissions (133 and 134) between a requesting unit (112) and a target communication unit (115) also occurs substantially as described above. One contemplated difference, on the other hand, between the small-cell system and the trunked system is that in the small-cell system a requesting communication unit and any target communication units operate on a single frequency using time division multiplexing. Time division multiplexing in a small-cell system allows a requestor and a target to share a single frequency.

In one embodiment of the invention, a small-cell communication resource may be allocated to a single set of transmitting/receiving communication units. As such, a requesting small-cell communication unit may be assigned the first of two TDM slots on a small-cell communication resource and target units would occupy the second of two TDM slots.

The small-cell communication system shown (FIG. 3) is an example of such a system. The small-cell system shown (FIG. 3) contains a number of repeaters (120 to 122). The system shown (FIG. 3) is an example of a small-cell system capable of handling a number of simultaneous small-cell communication transactions.

Small-cell communication units, because of the reduced power levels, are constructed to transmit from a few feet to a few hundred feet to service communication needs within a limited geographic area such as a manufacturing facility, a shopping mall, or other commercial or residential facility.

Shown in FIG. 2 is a small-cell communication system having a service coverage area (20) located at least a predetermined distance from the large-cell base site (10) operating within the previously described trunked communication system. Communication units (12 and 15), and (13 and 14) are engaged in two-way conversation supported by larger system infrastructure. In the example (FIG. 2) one communication unit (13) is approximately equidistant with the small-cell system to The base site (10). Because of the approximate equidistant locations and the power level of the mobile being several orders magnitude larger than the small-cell system, simultaneous re-use of the resource (38) within the small-cell system can occur without interference in reception of communication signals transmitted by the communication unit (13) at the base site.

The small-cell controller under these conditions may reallocate the previously granted resource (38) within the small-cell system. In FIG. 2 re-use of the resource

(38) is shown in a simultaneous conversation between small-cell units (112 and 115) over re-used communication resources (133 and 134). (Different reference numbers (133, and 134) are used in the drawing (FIG. 2) for the same communication resource (38) because the re-used communication resources (133 and 134) are time division multiplexed and the original communication resource (38) is not.)

Figure 3:
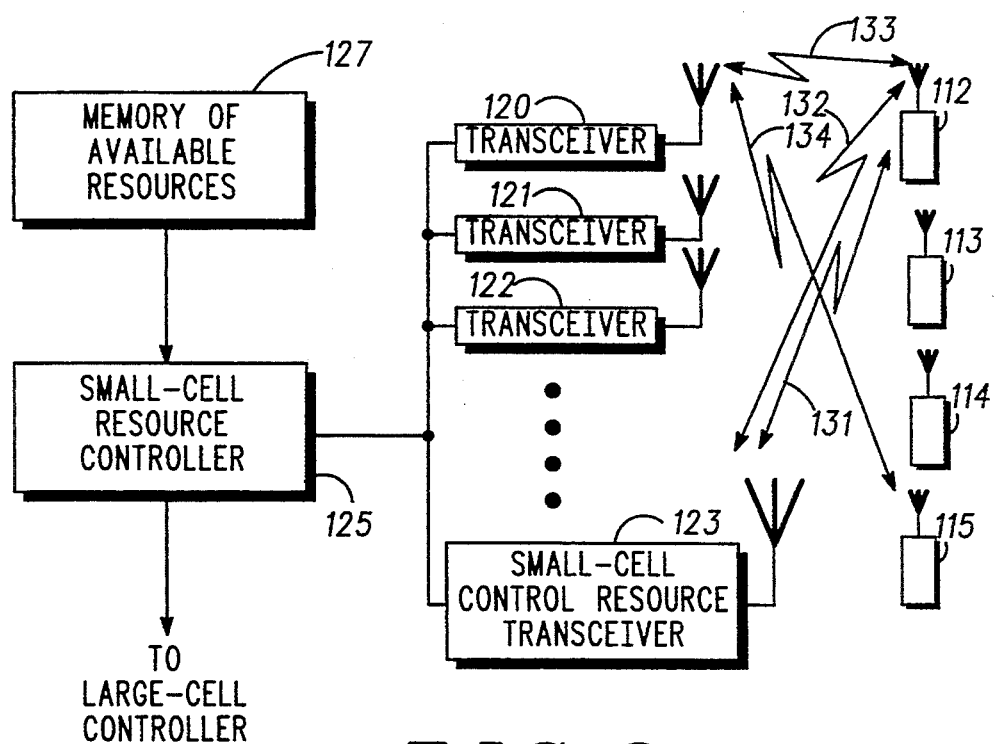
FIG. 3 comprises a block diagram of a single cell of a small-cell communication system.

To allow for the selective re-use of frequencies within the small-cell system a number of strategies are used. On start-up of the small-cell system a list of small-cell useable communication resources may be identified to the small-cell resource controller through manual entry of ID numbers of available communication resources into a table of communication resources within a memory (FIG. 3, 127). In normal operation the small-cell resource controller (functioning as a means for allocating unused communication resources to small-cell communication units using the small-cell control resource) allocates resources from the table sequentially from top to bottom, then from the top. Each time the small-cell resource controller receives a request for service the small-cell resource controller indexes sequentially down the table (allocating remaining resources) until an available resource is located.

In another embodiment of the invention a signal quality factor may be considered relative to small-cell re-use. The signal quality factor involves testing for signals useable within the large-cell system (large-cell useable communication signals). A signal useable within the large-cell system can be readily identified as to origin (as opposed to noise which cannot be identified). If a large-cell useable signal is identified on a resource then the small-cell system is not allowed use of the resource (the ID of the resource is removed from the list of small-cell useable communication resources).

The small-cell resource controller (functioning as a means for identifying a list of small-cell useable communication resources) independently and periodically, tests (and re-tests) the signal quality factor of resources listed as available within the resource table. Shown in flow chart form (FIG. 4) is the testing procedure used by the small-cell system. Resources listed as available but upon which a useable signal is detected (in-use communication resources) are determined to be unavailable within the small-cell system. Entry of such unavailability (204) is then made in the resource table. When a useable signal can no longer be detected then the above entry is cleared (205) from the resource table (the resource becomes an unused resource).

The small-cell resource controller upon detecting an in-use communication resource must also determine if any small-cell communication units have been allocated the tested resource. If the resource has been allocated then the small-cell controller must re-allocate (207) the small-cell communication unit to another unused resource.

Shown (FIG. 5) is a flow chart for resource allocation by The small-cell resource controller. As shown entry of a resource-unavailable code results in the resource controller skipping that resource (FIG. 5, 252) upon detection of the entry of such code.

The control resource used by the small-cell controller may be selected by a means for designating a small-cell useable communication resource as the control resource. The means for designating the control resource may be a keyboard on a control panel (not shown) through which a technician enters the ID of a unused resource as the control resource. The means for designating a control resource may also be comprised of the small-cell resource controller (125) selecting a control resource in a random manner or under the control of a suitable algorithm.

Disruption of small-cell signals may also occur over the small-cell control resource. The small-cell resource controller must also be on the alert for nearby trunked communication units on the small-cell control resource. The small-cell resource controller measures the signal quality factor of received signals on its own control resource and, if an interfering signal is received, the small-cell resource controller must move to another unused resource. If, after an inactive state, a small-cell communication unit then requests service over the previously designated small-cell control resource, and doesn't receive a response, the small-cell communication unit through use of a means (e.g. a scanner) for identifying the control resource of a small-cell system identifies the resource then being used as a control resource by the small-cell resource controller.

In another embodiment of the invention a dual-mode large-cell communication unit (16, FIG. 2) is constructed to transmit at normal power levels (large-cell power level) to the large-cell base site or at reduced power levels to small-cell base sites in a TDM format. Before transmitting a service request to the large-cell base site, a large-cell communication unit first scans available resources to locate nearby small-cell systems.

If a control resource of a small-cell system is identified, the large-cell communication unit preferentially transmits, at a reduced power level, a service request (150, FIG. 2) in a TDM format to the small-cell base site. The small-cell base site allocates a small-cell resource as previously described. The small-cell base site simultaneously allocates a communication resource to the large-cell base site, by wireline or otherwise, for use by the local large-cell communication unit.

Figure 6:
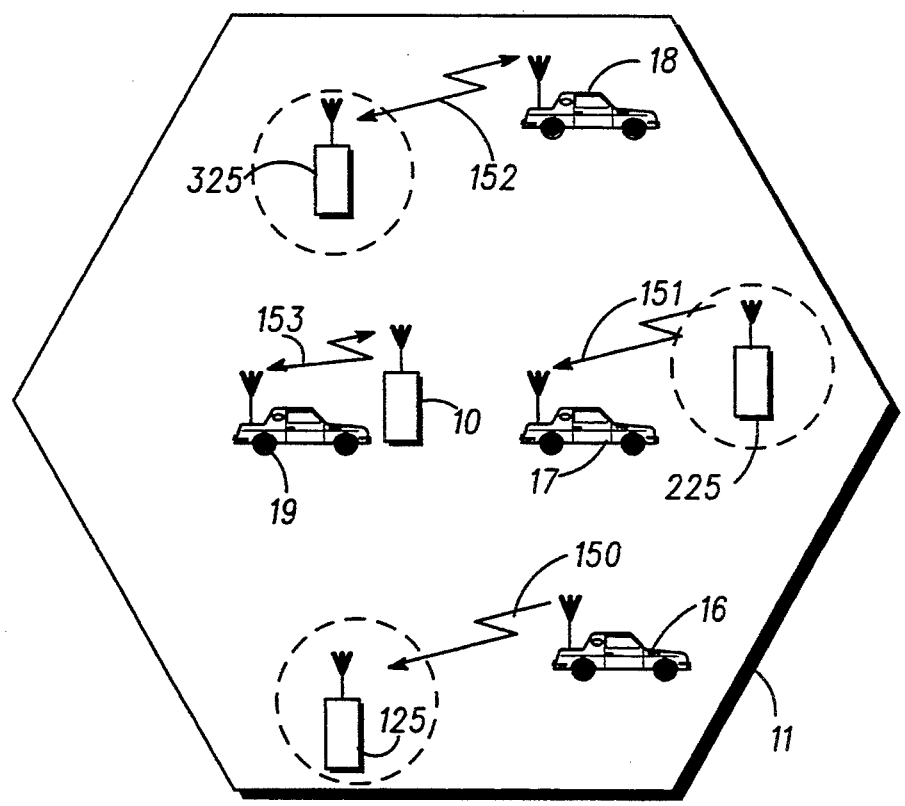
FIG. 6 comprises a geographical depiction of a single large-cell communication system with a number of small-cell systems located within.

The use of a plurality of dual mode, large-cell communication units (16 through 18 in FIG. 6) in a large cell communication system (11) with a plurality of small-cell communication systems (125, 225, and 325) may allow numerous large-cell communication units to communicate on the same communication resource. Communication unit (19 in FIG. 6) requests service and is granted a resource (153). Communication units (16, 17, and 18) may also, at a subsequent time, request service and be granted resources (150, 151, and 152 respectively). Since communication units (16, 17, and 18) are close to small-cell communication systems, the communication units (16, 17, and 18) transmit a resource request in a low power, TDM, format to the small-cell controllers ( 125, 225, and 325 respectively). If sufficient geographic diversity exists between communication units (16, 17, 18, and 19) and small-cell systems (125, 225, and 325) then the resource granted in each case may be identical.

We claim:

1. In a large-cell of a trunked radio system providing radio communications to large-cell communication units throughout a relatively large geographic region, said large-cell having a plurality of communication resources allocable to large-cell communication units within said large region, a method of re-using at least some of the plurality of communication resources by an at least one small-cell trunked system for providing radio communications throughout a relatively small geographic region within the large geographic region and where the at least one small-cell trunked system is located at least a predetermined distance from a large-cell base site of the large-cell trunked system, the method comprising of the steps of:
a) identifying a list of small-cell useable communication resources, of the plurality of communication resources, to a small-cell resource controller;
b) designating a communication resource of the list as a control resource for the small-cell controller; and
c) allocating remaining communication resources from the list to small-cell communication units using the control resource of the small cell.

2. The method of claim 1 wherein the step of allocating remaining communication resources further comprises the step of receiving, by the small-cell resource controller, a resource request from a small-cell communication unit.

3. The method of claim 2 wherein the step of allocating remaining communication resources further comprises the step of allocating, by the small-cell resource controller, a communication resource from the list to the requesting communication unit.

4. The method of claim 3 wherein the step of allocating a communication resource from the list further comprises the step of allocating a repeater in support of a communication transaction between the requesting communication unit and at least one target small-cell communication unit on the allocated resource.

5. The method of claim 4 wherein the step of allocating a repeater in support of a communication transaction between the requesting communication unit and at least one target small-cell communication unit on the allocated resource further comprises the step of repeating a communicated signal received in a first TDM slot of the allocated resource on a second TDM slot of the allocated resource.

6. The method of claim 1 where the step of identifying a list of useable communication resources to said small-cell resource controllers further including the steps of:
testing communication resources allocable to large-cell communication units for large-cell useable communication signals by the small-cell controller; and,
designating communication resources without large-cell useable communication signals as unused communication resources.

7. The method of claim 6 further including the steps of:
d) re-testing said communication resources for useable communications signals; and
e) de-allocating communication resources carrying large-cell useable communications signals detected by said re-testing of said communication resources from small-cell communication units.

8. The method of claim 7 further including the steps of:
f) re-testing said communication resources for large-cell useable communications signals; and
g) re-allocating communication resources not carrying large-cell useable communications signals detected by said re-testing of said communication resources in step f), to de-allocated small-cell communications units in step e.

9. The method of claim 1 further including the step of communicating within the at least one small-cell trunked system in a TDM format on a re-used large-cell inbound communication resource.

10. In a large-cell of a trunked radio system providing radio communications to large-cell communication units throughout a relatively large geographic region, said large-cell having a plurality of communication resources allocable to large-cell communication units within said large region, an apparatus for re-using at least some of the plurality of communication resources by an at least one small-cell trunked system for providing radio communications throughout a relatively small geographic region within the large geographic region and where the at least one small-cell trunked system is located at least a predetermined distance from a large-cell base site of the large-cell trunked system, the small-cell trunked system comprising:
a) a small-cell resource controller;
b) means for identifying a list of small-cell useable communication resources, of the plurality of communication resources, to the small-cell resource controllers;
c) means for designating an unused communication resource from the list as a control resource for the small-cell controller; and
d) means for allocating remaining unused communication resources to small-cell communication units using the control resource of the small-cell controller.

11. The apparatus of claim 10 wherein the means for allocating remaining communication resources further comprises means for receiving, by the small-cell resource controller, a resource request from a small-cell communication unit.

12. The apparatus of claim 11 wherein the means for allocating remaining communication resources further comprises means for allocating, by the small-cell resource controller, a communication resource from the list to the requesting communication unit.

13. The apparatus of claim 12 wherein the means for allocating a communication resource from the list further comprises means for allocating a repeater in support of a communication transaction between the requesting communication unit and at least one target small-cell communication unit on the allocated resource.

14. The apparatus of claim 13 wherein the means for allocating a repeater in support of a communication transaction between the requesting communication unit and at least one target small-cell communication unit on the allocated resource further comprises means for repeating a communicated signal received in a first TDM slot of the allocated resource on a second TDM slot of the allocated resource.

15. The apparatus of claim 10 where the means for identifying a list of useable communication resources to said small-cell resource controllers further comprising:
means for testing communication resources allocable to large-cell communication units for large-cell useable communication signals by the small-cell controller; and,
means for designating communication resources without large-cell useable communication signals as unused communication resources.

16. The apparatus of claim 15 further comprising:
e) means for re-testing said communication resources for useable communications signals; and
f) means for de-allocating communication resources carrying large-cell useable communications signals detected by said re-testing of said communication resources from small-cell communication units.

17. The apparatus of claim 16 further comprising:
g) means for re-testing said communication resources for large-cell useable communications signals; and
h) means for re-allocating communication resources not carrying large-cell useable communications signals detected by said re-testing of said communication resources in step f), to de-allocated small-cell communications units in step e.

18. The apparatus of claim 10 further comprising means for communicating within the at least one small-cell trunked system in a TDM format on a re-used large-cell inbound communication resource.

19. A small-cell trunking system providing trunked radio communications to small-cell communication units, said small-cell trunking system being located substantially within a first coverage area located at a predetermined location within a second, larger coverage area, said second area being provided with trunked radio communications by a large-cell trunking system having a large-cell trunking system controller, said small cell trunking system using at least some large-cell trunking system communication resources, said small-cell trunking system being comprised of:
receiver means for receiving trunked radio control signals on said large-cell communication resources;
transmitter means for transmitting trunked radio control signals on said communication resources;
small-cell resource controller means coupled to said receiver means and said transmitter means for controlling assignment of large-cell communication resources to small-cell communication units within said first coverage area using control signals received by said receiver means and transmitted by said transmitter means; and
at least one small-cell communication unit.

20. The small-cell trunking system of claim 19 further comprising:
repeater means for providing reception and distribution of signals within the coverage area of said small-cell, said repeater means being operatively coupled to said controller means for said small-cell.

21. The small-cell trunking system of claim 19 further comprising means for providing communication resources between the small-cell trunking system and the large-cell system to local large-cell communication units.

22. The small-cell trunking system of claim 19 where said at least one small-cell communication unit includes:
means for monitoring a small-cell control resource for small-cell trunking system commands, and means for submitting small-cell trunking system resource requests to said small-cell resource controller; and
means for communicating with other small-cell communication units using a communication resource.

23. The small-cell trunking system of claim 22 where said means for communicating with other small-cell communication units includes:
small-cell communication unit receiver means receiving radio communication signals; and
small-cell communication unit transmitter means transmitting radio communication signals.

24. A dual-mode trunked radio system communication unit for providing trunked radio communications within a large-cell communication system and, upon occasion, a small-cell communication system, such dual-mode communication unit comprising:
A) means for communicating within a large-cell communication system on a control resource and an allocated resource within the large-cell system at a large-cell power level;
B) means for scanning communication resources to detect the presence of a small-cell control resource;
C) means for communicating within a small-cell communication system under a time division multiplex format and at a reduced power level from the large-cell power level on the small-cell control resource detected by the means for scanning.

25. A method of providing trunked radio communications within a large-cell communication system and, upon occasion, a small-cell communication system to a dual-mode trunked radio system communication unit, the method comprising the steps of:
A) communicating within a large-cell communication system at a large-cell power level on a control resource and an allocated resource within the large-cell system;
B) scanning communication resources to detect the presence of a small-cell control resource;
C) communicating within a small-cell communication system under a time division multiplex format and at a reduced power level from the large-cell power level on the detected small-cell control resource.

26. A small-cell communication unit for communicating within a small-cell communication system located at least a predetermined distance from a large-cell base site, such small-cell communication unit comprising:
A) means for identifying a control resource of a small-cell resource controller;
B) means for transmitting resource requests to a small-cell resource controller on the control resource;
B) means for receiving resource allocations from the small cell resource controller on the control resource; and,
C) means for exchanging a communicated signal on a resource allocated by the small-cell resource controller.

* * * * *